United States Patent

Nakane et al.

Patent Number: 5,247,509
Date of Patent: Sep. 21, 1993

[54] DISK STORAGE WHICH AUTOMATICALLY ADJUSTS TO OPTIMUM RECORDING/REPRODUCING LEVEL

[75] Inventors: Kazuhiko Nakane; Kyosuke Yoshimoto; Yoshihiro Kiyose; Teruo Furukawa, all of Amagasaki; Akira Mashimo, Tokorozawa; Hiroyuki Onda, Hoya; Hidehiko Murata, Niiza; Takuya Nagata, Hoya, all of Japan

[73] Assignees: Mitsubishi Electric Corporation; TEAC Corporation, both of Japan

[21] Appl. No.: 767,078

[22] Filed: Sep. 27, 1991

[30] Foreign Application Priority Data

Oct. 1, 1990 [JP] Japan .................. 2-263555

[51] Int. Cl.⁵ .............................. G11B 7/00
[52] U.S. Cl. ..................... 369/116; 369/106
[58] Field of Search ............. 369/116, 106, 54, 58; 250/205

[56] References Cited

U.S. PATENT DOCUMENTS 4,698,797 10/1987 Komatsu .................. 369/116
5,126,993 6/1992 Yokota .................... 369/116

Primary Examiner—Paul M. Dzierzynski
Assistant Examiner—Jim Beyer
Attorney, Agent, or Firm—Andrus, Sceales, Starke & Sawall

[57] ABSTRACT

An optical or magneto-optical disk storage which automatically adjusts a recording/reproducing level of a number of kinds of optical or magneto-optical disks having different recording/reproducing levels to an optimum recording/reproducing level. The optical or magneto-optical disk storage has an attenuator which applies a predetermined attenuation amount to a reproduced signal reproduced from an optical or magneto-optical disk so as to attenuate the reproduced signal, or intensity adjusting means for adjusting the intensity of a laser beam used for recording and/or reproducing. The optical or magneto-optical disk storage detects an amplitude of the reproduced signal and feed-back-controls the attenuation amount or intensity of the laser beam in accordance with the detected amplitude.

10 Claims, 4 Drawing Sheets

FIG. 2

| INNER PART |
|---|
| READ-IN AREA |
| ⋮ |
| MANUFACTURE AREA |
| CALIBRATION AREA |
| CONTROL INFORMATION AREA |
| USER AREA |
| CONTROL INFORMATION AREA |
| CALIBRATION AREA |
| MANUFACTURE AREA |
| ⋮ |
| READ-OUT AREA |

OUTER PART

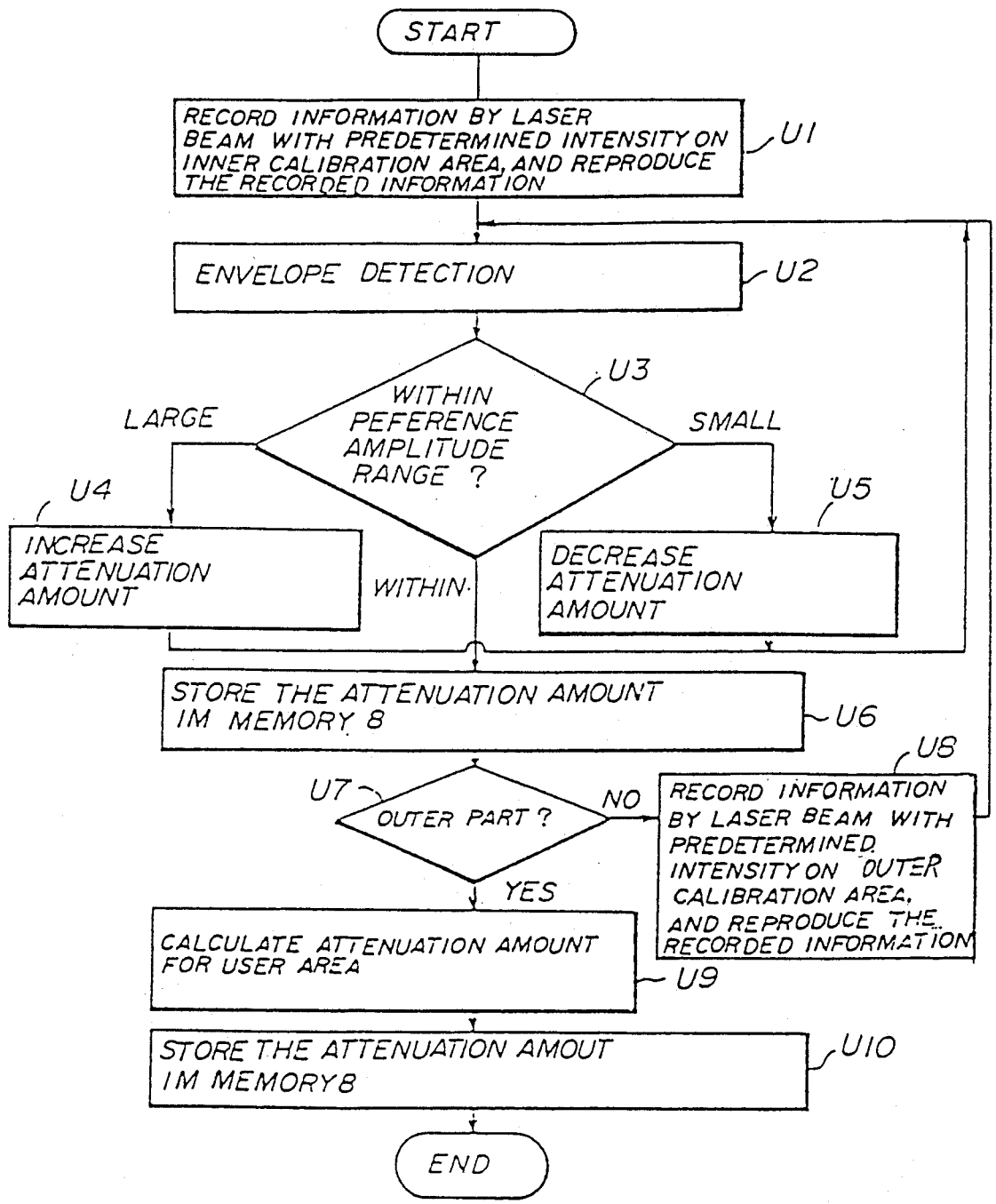

DISK STORAGE WHICH AUTOMATICALLY ADJUSTS TO OPTIMUM RECORDING/REPRODUCING LEVEL

BACKGROUND OF THE INVENTION

The present invention relates generally to optical or magneto-optical disk storages, and more particularly to an optical or magneto-optical disk storage which automatically adjusts recorded/reproduced levels of a number of kinds of optical or magneto-optical disks having different recorded/reproduced levels to optimum recorded/reproduced levels.

In an optical disk storage adopting a constant angular velocity (CAV) method, recording densities between inner and outer tracks are different, and thus a signal reproduced at the inner track has a reproduced level lower than that of a signal reproduced at the outer track. Accordingly, a conventional apparatus uses an automatic gain control (abbreviated AGC hereinafter) circuit to gain-control the levels of respective signals reproduced at both the inner and outer tracks. In addition, a so-called write-once optical disk storage uses a gain switching circuit which switches a gain every recording/reproducing to prevent circuitry saturation and maintain constant signal level.

On the other hand, when a 3.5 in optical disk was not conventionally standardized, each company individually developed an optical disk made of a distinctive material and a corresponding optical disk storage. However, now that optical disks are standardized by the ISO standard and ANSI standard, an optical disk storage compatible with optical disks, even if made by other companies however conformable to one of the above standard, is requested.

However, since optical disks made by other companies have various reproduced levels because of the different materials and thus some of levels deviates from an operatable gain range for the AGC circuit in the conventional optical disk storage, the conventional optical disk storage cannot reproduce such an optical disk at its optimum level.

SUMMARY OF THE INVENTION

Accordingly, it is a general object of the present invention to provide novel and useful optical and magneto-optical disk storages in which the above disadvantage is eliminated.

Another more specific object of the present invention is to provide optical and magneto-optical disk storage compatible with a number of kinds of optical disks or magneto-optical disks having different recording/reproducing levels.

According to one feature of the present invention, an optical disk storage comprises an optical head which reproduces information from an optical disk, an attenuator, coupled to the optical disk, which applies a predetermined attenuation amount to a reproduced signal reproduced from the optical disk by the optical head so as to attenuate the reproduced signal, amplitude detecting means, coupled to the optical head, for detecting an amplitude of the reproduced signal, and control means, coupled to the amplitude detecting means and the attenuator, for feed-back-controlling an attenuation amount of the attenuator in accordance with the amplitude of the reproduced signal detected by the amplitude detecting means. Incidentally, a magneto-optical disk storage according to the present invention can be provided by substituting a magneto-optical disk for an optical disk and reproducing means for an optical head.

According to another feature of the present invention, an optical disk storage comprises an optical head which radiates a laser beam on an optical disk to record information thereon and/or to reproduce information therefrom, intensity adjusting means, coupled to the optical head, for adjusting the intensity of the laser beam of the optical head, amplitude detecting means, coupled to the optical head, for detecting an amplitude of a reproduced signal reproduced by the optical head, and control means, coupled to the optical head, amplitude detecting means and intensity adjusting means, for controlling the optical head to reproduce information recorded on the optical disk, for controlling the amplitude detecting means to detect an amplitude of the information reproduced by the optical head, and for controlling the intensity adjusting means to adjust the intensity of the laser beam of the optical head in accordance with the amplitude of the information detected by the amplitude detecting means. Incidentally, a magneto-optical disk storage according to the present invention can be provided by substituting a magneto-optical disk for an optical disk and recording/reproducing means for an optical head.

According to still another feature of the present invention, an optical disk storage comprises an optical head which radiates a laser beam on an optical disk to reproduce information therefrom, intensity adjusting means, coupled to the optical head, for adjusting the intensity of the laser beam of the optical head, amplitude detecting mean, coupled to the optical head, for detecting an amplitude of a reproduced signal reproduced by the optical head, and control means, coupled to the amplitude detecting means and intensity adjusting means, for controlling the intensity adjusting means to adjust the intensity of the laser beam of the optical head in accordance with the amplitude of the reproduced signal detected by the amplitude detecting means. Incidentally, a magneto-optical disk storage according to the present invention can be provided by substituting a magneto-optical disk for an optical disk and reproducing means for an optical head.

According to the present invention, since the attenuation amount or the intensity of the laser beam can be adjusted in accordance with the amplitude of the reproduced signal, optical and magneto-optical disk storages compatible with disks made of different materials can be provided.

Other objects and further features of the present invention will become apparent from the following detailed description when read in conjunction with the accompanying drawings.

BRIEF DESCRIPTION OF THE DRAWINGS

FIG. 2 is a view showing a rough construction of the magneto-optical disk used for the magneto-optical disk storage shown in FIG. 1;

FIG. 4 is a flowchart for explaining a recording operation of the magneto-optical disk storage shown in FIG. 1.

DETAILED DESCRIPTION OF THE PREFERRED EMBODIMENTS

Figure 1:
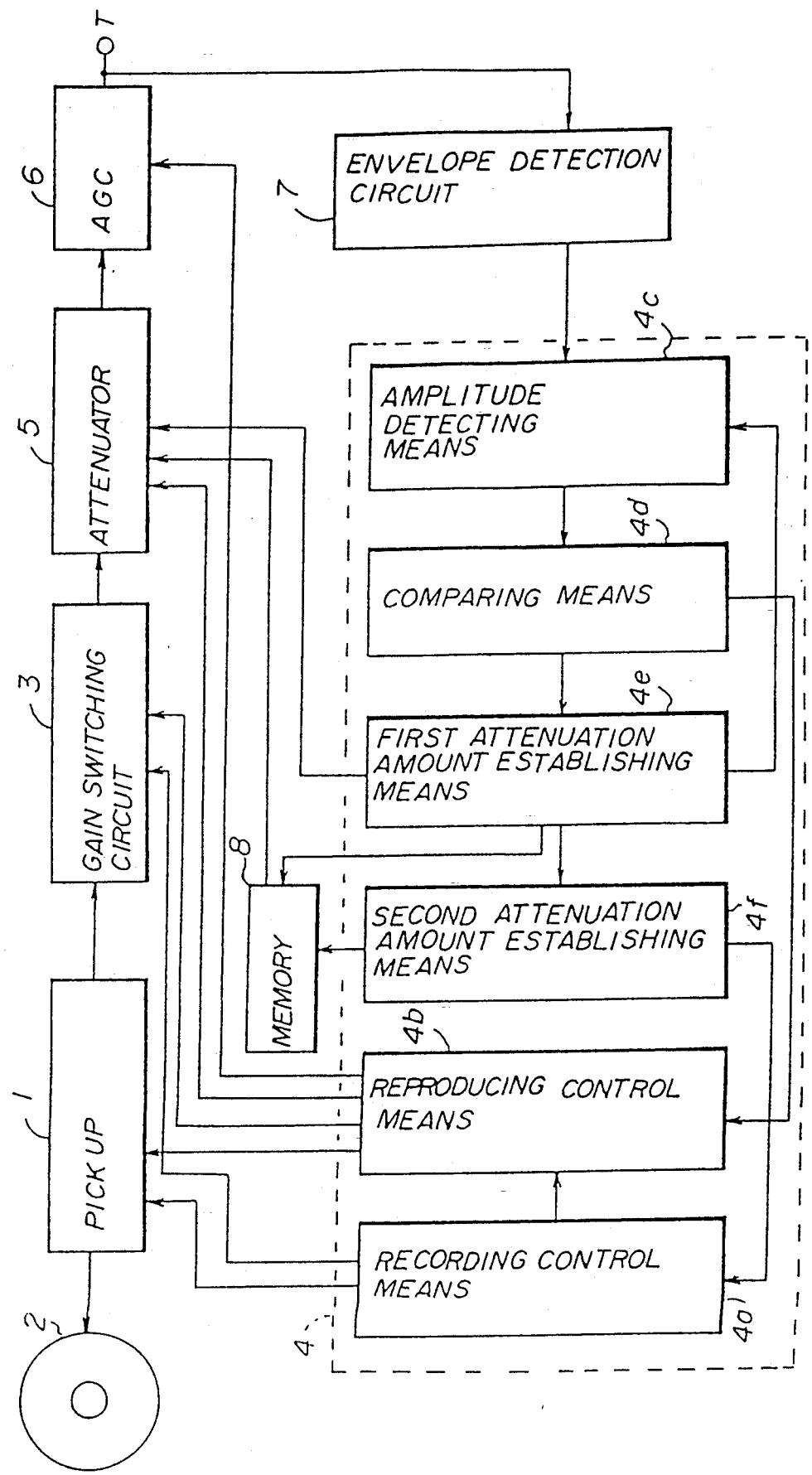
FIG. 1 is a principal block diagram of a magneto-optical disk storage according to the present invention.

The magneto-optical disk storage according to the present invention comprises, as shown in FIG. 1, a pickup 1, a gain switching circuit 3, a control circuit 4, an attenuator 5, an AGC circuit 6, an envelope detection circuit 7, and a memory 8. The control circuit 4 is coupled to the pickup 1, gain switching circuit 3, attenuator 5, AGC circuit 6, envelope detection circuit 7 and memory 8. The pickup 1 is further coupled to the gain switching circuit 3. The attenuator 5 is further coupled to the gain switching circuit 3, AGC circuit 6 and memory 8. The envelope detection circuit 7 is further coupled to the AGC circuit 6.

The pickup 1 radiates a laser beam on a desired track on the magneto-optical disk 2 to record information thereon by using a permanent magnet (not shown) and reproduce information therefrom. The pickup 1 outputs a signal reproduced from the magneto-optical disk 2 to the gain switching circuit 3.

The magneto-optical disk 2 comprises, for example, a higher reflection film disk or a magneto-optical film disk. The magneto-optical disk 2 comprises, as shown in FIG. 2, a read-in area, two manufacture areas, two calibration areas, a user area, two control information areas, and a read-out area. The two manufacture areas are used for a performance examination by manufacturer. The two calibration areas, designed for a higher reproducing characteristic, are used to adjust the intensity of the laser beam. The two control information areas preformats information to optimize a recording/reproducing characteristic. An area on which the user writes data is referred to as a data part, and a preformat area, such as an address area, is referred as a header part. A signal reproduced at the data part has a reproducing level different from that reproduced at the header part.

The gain switching circuit 3 switches a gain within a range of about 6dB every recording/reproducing or in accordance with material of a magneto-optical disk. An output of the gain switching circuit 3 is supplied to the attenuator 5.

The attenuator 5 outputs an amplitude of the output of the gain switching circuit 3 while attenuating it in accordance with an attenuation amount determined by the control circuit 4, to the AGC circuit 6.

The AGC circuit 6, controlled by the control circuit 4, supplies the output of the attenuator 5 to an output terminal T and the envelope detection circuit 7 while gain-controlling the output level of the attenuator 5 not to deviate from a predetermined range.

The envelope detection circuit 7 supplies a signal from the AGC circuit to the control circuit 4 while performing an envelope detection for the signal.

The control circuit 4 comprises recording control means 4a, reproducing control means 4b, amplitude detecting means 4c, comparing means 4d, first and second attenuation amount establishing means 4e and 4f. The reproducing control means 4b is further coupled to the pickup 1, gain switching circuit 3, comparing means 4d, attenuator 5 and AGC circuit 6. The amplitude detection means 4c is further coupled to the comparing means 4d, first attenuation amount establishing means 4e and envelope detection circuit 7. The comparing means 4d is further coupled to the first attenuation amount establishing means 4e. The first attenuation amount establishing means 4e is further coupled to the second attenuation amount establishing means 4f, attenuator 5, and memory 8. The second attenuation amount establishing means 4f is further coupled to the memory 8.

The recording control means 4a instructs the gain switching circuit 3 to switch to a recording mode with a relatively low gain, and controls recording/erasing operations of the pickup 1 and the permanent magnet (not shown). The reproducing control means 4b instructs the gain switching circuit 3 to switch to a reproducing mode, and controls a reproducing operation of the pickup 1. If the magneto-optical disk 2 is comprises a higher reflection film disk, the gain switching circuit 3 switches to a reproducing mode with a low gain since the higher reflection film disk has a high reproducing level. On the contrary, if the magneto-optical disk 2 is comprises a magneto-optical film disk, the gain switching circuit 3 switches to a reproducing mode with a high gain since the magneto-optical disk film disk has a low reproducing level. The reproducing control means 4b determines the attenuation amount of the attenuator 5, and controls the AGC circuit 6. The amplitude detection means 4c detects an amplitude of a signal from the envelope detection circuit 7, and then outputs the amplitude to the comparing means 4d. The comparing means 4d judges whether the amplitude from the amplitude detection circuit 4c is within a reference amplitude range. The first attenuation amount establishing means 4e establishes the respective attenuation amounts of the inner and outer control information areas and the inner and outer calibration areas. The second attenuation amount establishing means 4f, establishes the attenuation amount of the user area.

Figure 3:
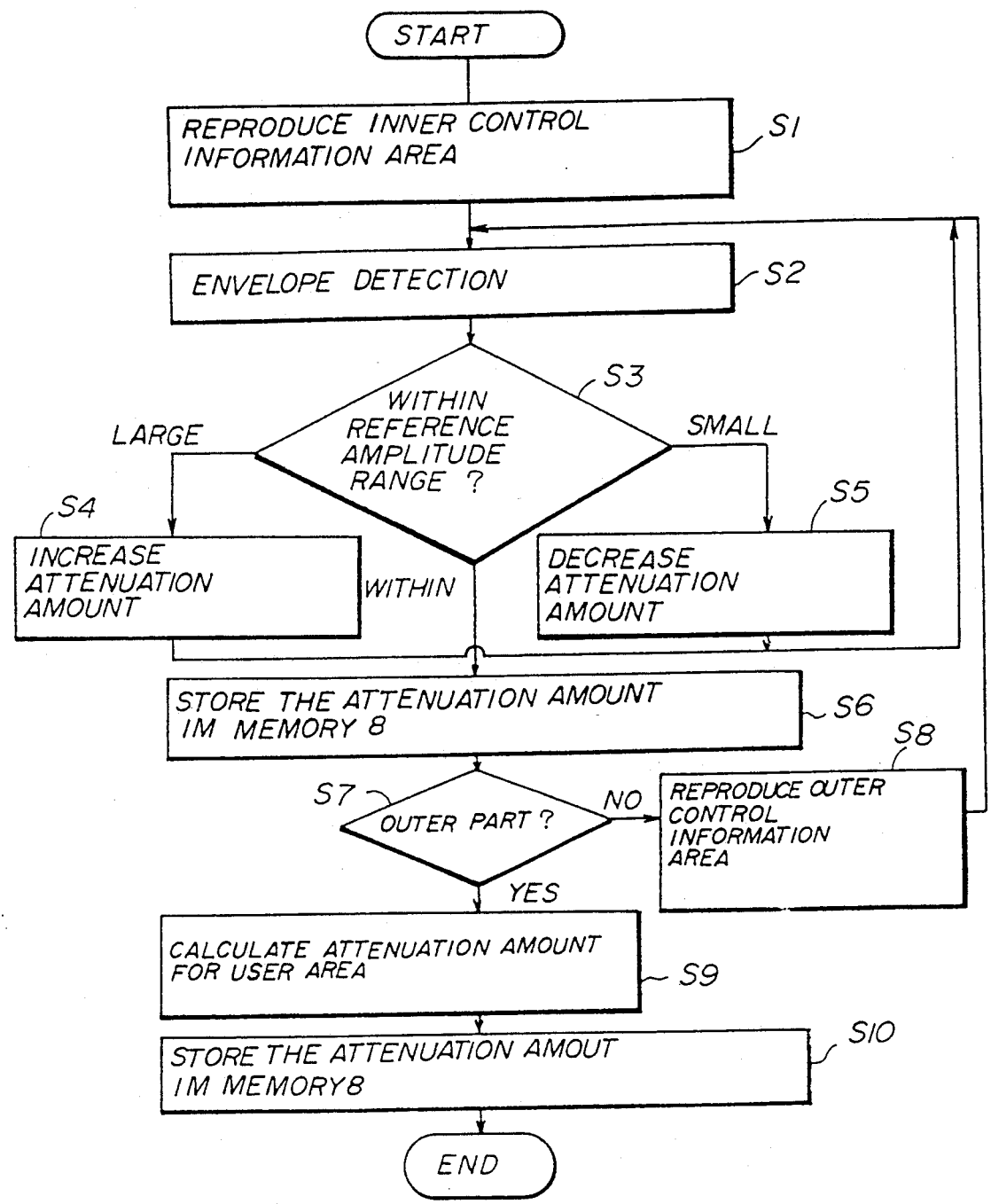
FIG. 3 is a flowchart for explaining a reproducing operation of the magneto-optical disk storage shown in FIG. 1.

Next, a description will now be given of how the control circuit 4 establishes the attenuation amount for the attenuator 5 during reproducing, with reference to FIG. 3.

First, the inner control information track is reproduced to obtain a reproduced signal (in step S1), while centering both gains at the respective AGC circuit 6 and attenuator 5. Next, the envelop detection circuit 7 performs an envelop detection for the reproduced signal (in step S2). The amplitude detecting means 4c of the control circuit 4 detects the amplitude of the envelope-detected reproduced signal and outputs the amplitude to the comparing means 4d. The comparing means 4d judges whether the amplitude of the reproduced signal is within the reference amplitude range (in step S3). The first attenuation amount establishing means 4e establishes an attenuation amount so that the amplitude of the reproduced signal can be within the reference amplitude range (in steps S4 and S5), and stores the attenuation amount in the memory 8 (in step S6). Then, the outer control information area is reproduced (in steps S7 and S8), and the procedure is fed back to the step S2. Subsequently, the second attenuation amount establishing means 4f establishes the attenuation amount for the user area, which is the data part, in accordance with the attenuation amounts of the respective inner and outer control information areas (in step S9), and the attenuation amount of the user area is stored in the memory 8 (in step S10).

Next, as shown in FIG. 4, information is first recorded on the inner calibration area of the magneto-optical disk by means of the laser beam with a predetermined intensity, and then the recorded information is reproduced (in step U1). Then, procedures U2 to U10 respectively corresponding to the steps S2 to S10 are repeated. Thus, since the attenuation amount of the attenuator 5 is controlled in accordance with a level of a reproduced signal of every kind of a magneto-optical disk, the level of the reproduced signal can be approximately centered in an operatable gain range of the AGC circuit 6.

Incidentally, unlike the present embodiment, a light amount (intensity of the laser beam to be radiated on the magneto-optical disk 2 may be adjusted. In addition, the present invention can be applied to an optical disk storage, a magneto-optical disk storage and a CD-ROM disk storage.

According to the present invention, since the attenuation amount or the intensity of the laser beam in accordance with an amplitude of a reproduced signal is adjusted, an optimum reproducing signal can be obtained irrespective of the kind of a disk. In addition, the optimum reproducing level of a disk can be automatically established even if a reproducing level of the reproduced signal is not known. Moreover, the AGC circuit can stably operate.

Further, the present invention is not limited these preferred embodiments, as various variations and modifications may be made without departing from the scope of the present invention.

What is claimed is:

1. An optical disk storage comprising:
   an optical head which reproduces information from an optical disk;
   an attenuator, coupled to said optical head, which attenuator applies an attenuation amount to a reproduced signal, which signal is reproduced from the optical disk by said optical head, the attenuation amount being applied so as to attenuate the reproduced signal;
   a gain control circuit, coupled to said attenuator, for controlling a gain in the signal output from said attenuator;
   amplitude detecting means, coupled to said optical head through said attenuator and said gain control circuit, for detecting an amplitude of the attenuated or unattenuated reproduced signal; and
   control means, coupled to said amplitude detecting means and said attenuator, for controlling an attenuation amount of said attenuator in correspondence to the amplitude of the attenuated or unattenuated reproduced signal detected by said amplitude detecting means.

2. The optical disk storage according to claim 1, wherein
   said disk includes inner and outer control information areas, inner and outer calibration areas, and a user area;
   said amplitude detecting means detects amplitudes of the reproduced signals reproduced from the inner and outer control information areas and the inner and outer calibration areas of the optical disk; and wherein
   said control means further comprises and attenuation-amount establishing means for establishing respective variable attenuation amounts of said attenuator for the inner and outer control information areas, the inner and outer calibration areas, and the user area of the optical disk in correspondence to at least one of said amplitudes of the reproduced signals reproduced from the inner and outer control information areas and the inner and outer calibration areas of the optical disk.

3. The optical disk storage according to claim 2, wherein said attenuation-amount establishing means further comprises:
   first attenuation-amount establishing means for establishing the respective attenuation amounts of said attenuator for the inner and outer control information areas and the inner and outer calibration areas of the optical disk, which attenuation amounts correspond to at least one of said amplitudes of the reproduced signals reproduced from the inner and outer control information areas and the inner and outer calibration areas of the optical disk; and
   second attenuation-amount establishing means for establishing the attenuation amount of said attenuator for the user area of the optical disk as a result of a calculation in correspondence to at least one of said respective attenuation amounts of said attenuator for the inner and outer control information areas and the inner and outer calibration areas.

4. The optical disk storage according to claim 1, wherein the attenuation amount of said attenuator is established so that the level of the signal output from said attenuator is approximately centered in an operating gain range of said gain control circuit.

5. The optical disk storage according to claim 2, further comprising a memory for storing the attenuation amount established by said attenuation-amount establishing means.

6. A magneto-optical disk storage comprising:
   reproducing means for reproducing information from a magneto-optical disk;
   an attenuator, coupled to said reproducing means, which attenuator applies an attenuation amount to a reproduced signal, which signal is reproduced from the magneto-optical disk by said reproducing means, the attenuation amount being applied so as to attenuate the reproduced signal;
   a gain control circuit, coupled to said attenuator, for controlling a gain in the signal output from said attenuator
   amplitude detecting means, coupled to said reproducing means through said attenuator and said gain control circuit, for detecting an amplitude of the attenuated or unattenuated reproduced signal; and
   control means, coupled to said amplitude detecting means and said attenuator, for controlling an attenuation amount of said attenuator in correspondence to the amplitude of the attenuated or unattenuated reproduced signal detected by said amplitude detecting means.

7. The magneto-optical disk storage according to claim 6, wherein:
   said disk includes inner and outer control information areas, inner and outer calibration areas, and a user area;
   said amplitude detecting means detects amplitudes of the reproduced signals reproduced from the inner and outer control information areas and the inner and outer calibration areas of the magneto-optical disk; and
   said control means further comprises an attenuation amount establishing means for establishing respective variable attentuation amounts of said attenuator for the inner and outer control information areas, the inner and outer calibration areas, and the user area of the magneto-optical disk in correspondence to at least one of said amplitudes of the reproduced signals reproduced from the inner and outer control information areas and the inner and outer calibration areas of the magneto-optical disk.

8. The magneto-optical disk storage according to claim 7, wherein said attenuation-amount establishing means further comprises:

first attenuation-amount establishing means for establishing the respective attenuation amounts of said attenuator for the inner and outer control information areas and the inner and outer calibration areas of the magneto-optical disk, which attenuation amounts correspond to at least one of said amplitudes of the reproduced signals reproduced from the inner and outer control information areas and the inner and outer calibration areas of the magneto-optical disk; and second attenuation-amount establishing means for establishing the attenuation amount of said attenuator for the user area of the magneto-optical disk as a result of a calculation in correspondence to at least one of said respective attenuation amounts of said attenuator for the inner and outer control information areas and the inner and outer calibration areas.

9. The magneto-optical disk storage according to claim 6, wherein the attenuation amount of said attenuator is established so that the level of the signal output from said attenuator is approximately centered in an operating gain range of said gain control circuit.

10. The magneto-optical disk storage according to claim 7, further comprising a memory for storing the attenuation amount established by said attenuation-amount establishing means.

* * * * *